United States Patent [19]
Yavnieli

[11] 4,109,408
[45] Aug. 29, 1978

[54] INSECT ELECTROCUTION DEVICE

[75] Inventor: Mordechai Yavnieli, Tel-Aviv, Israel

[73] Assignee: AMCOR Ltd., Tel-Aviv, Israel

[21] Appl. No.: 757,571

[22] Filed: Jan. 7, 1977

[30] Foreign Application Priority Data

Jan. 14, 1976 [IL] Israel .................................. 48833

[51] Int. Cl.² ............................................ A01M 1/22
[52] U.S. Cl. ..................................................... 43/112
[58] Field of Search ............................ 43/112, 98, 99

[56] References Cited

U.S. PATENT DOCUMENTS

| | | | |
|---|---|---|---|
| 1,167,855 | 1/1916 | Stipp | 43/112 |
| 2,441,499 | 5/1948 | Medlin | 43/98 X |
| 2,835,071 | 5/1958 | Partridge | 43/112 |
| 3,346,988 | 10/1967 | Pickering | 43/112 |
| 3,491,478 | 1/1970 | Gilbert | 43/112 |
| 3,685,198 | 8/1972 | Smith | 43/112 |
| 3,729,857 | 5/1973 | Giordano | 43/112 |

FOREIGN PATENT DOCUMENTS

| | | | |
|---|---|---|---|
| 600,065 | 6/1960 | Canada | 43/112 |
| 990,897 | 5/1965 | United Kingdom | 43/112 |

Primary Examiner—Clifford D. Crowder
Attorney, Agent, or Firm—Browdy and Neimark

[57] ABSTRACT

Insect electrocution device providing:
  a surface array composed of an arrangement of spaced first electrodes; and
  a sheet electrode disposed on a surface spaced from the surface array;
  the first electrodes being maintained at a first potential;
  the sheet electrode being maintained at a second potential differing from the first potential.

The spacing between the first electrodes is greater than the spacing between the sheet electrode and the first electrodes.

25 Claims, 4 Drawing Figures

INSECT ELECTROCUTION DEVICE

FIELD OF THE INVENTION

The present invention relates to insect control devices generally, and more particularly to devices for killing insects by electrocution thereof.

BACKGROUND OF THE INVENTION

A large variety of different types of devices for electrocuting insects are well known and presently being marketed. These devices may be collectively described as comprising a plurality of electrodes of differing electrical potentials disposed in a spaced array. The presence of an insect between the electrodes results in an electrical arcing across the path defined in part by the insects, and subsequent electrocution thereof.

There are known devices having a relatively large spacing between electrodes which are suitable for control of relatively large insects. The same devices are not very useful for the control of small insects and it is possible for small insects to pass between the electrodes without triggering electric arcing.

A second type of device having relatively closely spaced electrodes which are effective for the control of relatively small insects tends to become clogged by the remains of large insects which can become entangled between the electrodes. Incineration of the relatively large insects produces remains which do not always fall from the electrodes. The insect remains engaging the electrodes inhibit the passage of small insects past the electrodes and more importantly reduce the electrical efficiency of the device due to leakage between oppositely charged electrodes across the insect remains.

A variety of devices are also known having electrode arrays which define a plurality of differing spacings between electrodes so as to accommodate for electrocution both relatively large and relatively small insects.

These devices as well as many of the prior art devices described generally hereinabove are relatively complex and expensive to manufacture and maintain since relatively precise tolerances are required in the spacing of the electrodes for optimal performance.

SUMMARY OF THE INVENTION

The present invention seeks to provide an improved, simplified and more economical insect control device which is suitable for relatively maintenance free electrocution of both large and small insects.

There is provided in accordance with an embodiment of the invention an insect electrocution device comprising:

a surface array composed of an arrangement of spaced first electrodes; and a sheet electrode disposed on a surface spaced from said surface array;

said first electrodes being maintained at a first potential;

said sheet electrode being maintained at a second potential differing from said first potential.

Further in accordance with an embodiment of the invention the insect electrocution device may be constructed such that the sheet electrode is formed with a multiplicity of protrusions extending outwardly from the surface of said sheet towards said surface array.

Additionally in accordance with an embodiment of the invention an insect electrocution device may be provided wherein the surface array also comprises an array of second electrodes interspersed with said first electrodes, said second electrodes being maintained at a third potential differing from said first potential;

said first and second electrodes being arranged in said first surface array so as to define a first substantially uniform separation between respective first and second electrodes;

said sheet electrode being spaced from said first and second electrodes by a second separation smaller than said first uniform separation.

In accordance with an embodiment of the invention the sheet electrode comprises a screen formed of a surface array of intersecting uniformly spaced third electrodes. According to an alternative embodiment of the invention the sheet electrode comprises a solid electrode. The sheet electrode may be planar or configured in any other suitable curved or other configuration.

Further in accordance with an embodiment of the invention the third potential may be identical to the second potential. According to an alternative embodiment of the invention the third potential may differ from both the first and second potentials. In accordance with a preferred embodiment of the invention the potential difference between the third potential and either of the first and second potentials may be chosen to be less than the potential difference between the first and second potentials. The potentials may be AC or DC.

According to a further embodiment of the invention means are provided for directly illuminating some or all of the electrodes for the purpose of attracting insects thereto. The device may also be constructed so as to minimize light reflection from surfaces other than the electrodes.

According to a still further embodiment of the invention means are provided for heating some or all of the electrodes in order to increase their attractiveness to certain types of insects and to enhance the effectiveness of bait placed in the immediate vicinity thereof.

BRIEF DESCRIPTION OF THE DRAWINGS

The invention will be more fully understood and appreciated from the following detailed description taken in conjunction with the drawings in which.

DETAILED DESCRIPTION OF THE INVENTION

Figure 1:
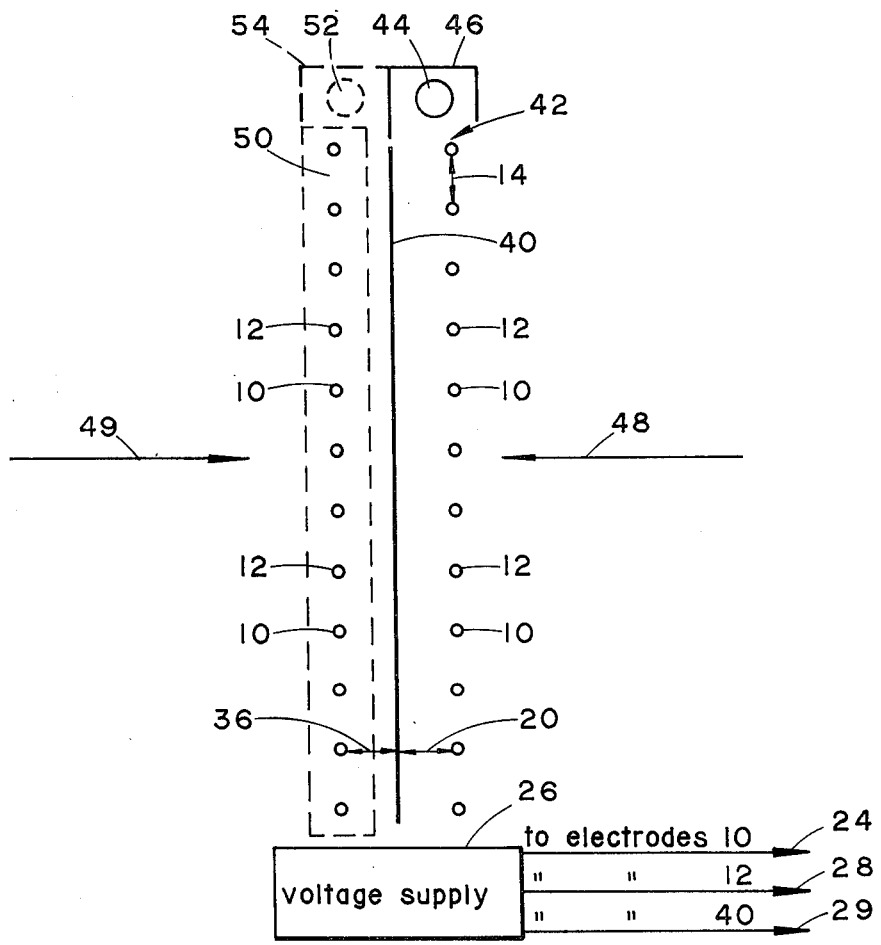
FIG. 1 is a schematic sectional diagram of the electrode configuration of an insect electrocution device constructed and operative according to an embodiment of the invention.

Referring now to FIG. 1 there is shown an electrode arrangement in which a unitary sheet electrode 40 is maintained in spaced generally parallel relationship to a surface array 42 comprising electrodes 10 and 12. Sheet electrode 40 is typically a metal sheet or screen, configured to conform to the shape of the surface array 42. Thus electrode 40 may be planar curved or of any other suitable configuration. Electrodes 10 and 12 are typically elongate cylindrical rods formed of brass or any other suitable material. Alternatively, electrodes of any other suitable configuration and composition may be employed. The spatial separation 20 between sheet electrode 40 and array 42 of electrodes 10 and 12 is selected to be less than the spatial separation 14 between adjacent electrodes 10 and 12.

The term "sheet electrode" will be used herein to describe an electrode which is generally thin in comparison to its length and breadth. Thus, a sheet electrode includes an electrode which has protuberances and projections which are short compared to the length and breadth of the electrode.

In accordance with a preferred embodiment of the invention a lamp 44 is provided to directly illuminate planer electrode 40 so as to enhance its attractiveness to insects. A shade 46 is provided partially surrounding lamp 44 and arranged such that direct illumination from the lamp is not visible to insects approaching the electrode arrangement in a general direction indicated by arrow 48.

In accordance with an embodiment of the invention sheet electrode 40 is disposed behind array 42 with respect to the incidence of insects whose approach path contains a component codirectional with an arrow 48.

In accordance with a preferred embodiment of the invention electrodes 10 are connected to a first output 24 of a conventional voltage supply 26 which establishes a first potential thereon. Electrodes 12 are connected to a second output 28 of voltage supply 26 which establishes a second potential on electrodes 12. Electrode 40 is similarly coupled to a third output 29 of voltage supply 26 which establishes a third potential on electrode 40.

Preferably the potential difference between electrodes 10 and 12 is selected to be greater than the potential difference between electrode 40 and either of electrodes 10 or 12. The magnitude of the potential difference between adjacent electrodes governs the minimum separation that can be established therebetween without resulting in arcing between adjacent electrodes in the absence of foreign objects disposed therebetween. Therefore selection of the potential difference between electrode 40 and either of electrodes 10 and 12 to be less than the potential difference between adjacent electrodes 10 and 12 enables spatial separation 20 to be less than spatial separation 14. In a typical case where separation 14 equals 8 mm and separation 20 equals 4 mm, electrodes 10 and 12 are coupled to phase-separated 4000 volt AC voltage sources and electrode 40 is coupled to a 2000 volt AC power source. Alternatively, for the same spacings the first potential may be 6000 volts DC, the second potential zero and the third potential 3000 volts DC. In a further exemplary embodiment for either of the voltage relationships set forth above, spacing 20 may be any distance between 4 and 8 mm. Many other arrangements of electrode spacings and voltages are also possible.

It is appreciated that insects approaching the electrode apparatus in a direction which includes a directional component codirectional with arrow 48 will first traverse the potential gap defined between adjacent electrodes 10 and 12. Upon traversing this potential gap the relatively large insects tend to partially bridge the spatial separation between adjacent electrodes 10 and 12 causing electrical arcing across the body of each insect and consequent electrocution thereof. Relatively small insects which are not large enough to sufficiently bridge the gap between electrodes 10 and 12 so as to result in arcing are therefore not electrocuted as they pass array 42. The presence of relatively small insects in the gap between sheet electrode and array 42 which as noted previously is smaller than the gap between electrodes 10 and 12, is sufficient to cause arcing between an electrode of array 42 and a sheet electrode 40 and consequent electrocution of the insect.

A particular feature of the electrode arrangement described hereinabove in connection with FIG. 1 is that large insects tend to be electrocuted as they initially pass between adjacent electrodes 10 and 12 and thus do not tend to reach the relatively narrower gap between electrode 40 and array 42. The arrangement of electrodes overcomes a problem of many prior art devices in which clogging produced by entry and electrocution of relatively large insects in relatively small gaps required frequent cleaning of the device to maintain its efficiency.

In accordance with an alternative embodiment of the invention an insect electrocution device may be constructed in which electrodes 10 and 12 are maintained at the same potential, here termed the first potential and the sheet electrode is maintained at a second potential differing from the first potential. In this configuration electrodes 10 and 12 may be maintained at any desired uniform or non-uniform spacing. A typical spacing between adjacent electrodes 10 and 12 in this embodiment is 20 mm while the separation between electrode array 42 and sheet electrode 40 is 4 mm. In accordance with this embodiment of the invention, voltage supply 26 may be constructed to have only two terminals, one of which may be maintained at ground potential.

In accordance with a further alternative embodiment of the invention an insect electrocution device may be constructed in a "two-sided" configuration for control of insects approaching the device in virtually any direction which contains a directional component, codirectional with either of arrows 48 and 49. In accordance with this embodiment of the invention an additional array 50 (outlined in phantom) of electrodes 10 and 12, substantially identical for all relevant purposes to array 42, may be disposed substantially parallel to sheet electrodes 40 and on the opposite side thereof from array 42 and spaced therefrom by a spatial separation 36. Spatial separation 36 is preferably equal to spatial separation 20 but may differ therefrom.

An additional lamp 52 and shade 54, also shown in phantom, may also be added. The illumination lamps and their shades may be disposed and configured in any desired suitable arrangement to provide direct illumination of either or both of electrode 40 and arrays 42 and 50.

In accordance with an embodiment of the invention electrode 40 may be coupled to output 24 or to output 28 so as to be maintained at a potential identical to either of the potentials maintained at electrode 10 or 12. In such a case output 29 of voltage source 26 can be eliminated. In the case where either of electrodes 10 and 12 is maintained at zero potential and electrode 40 is maintained at a potential equal to the potential of either electrodes 10 or 12, voltage supply 26 may provide a single voltage output to any of the following electrode combinations: 10 and 40, 12 and 40, 10 or 12 and the remaining electrode or electrodes may be coupled to ground.

Figure 2:
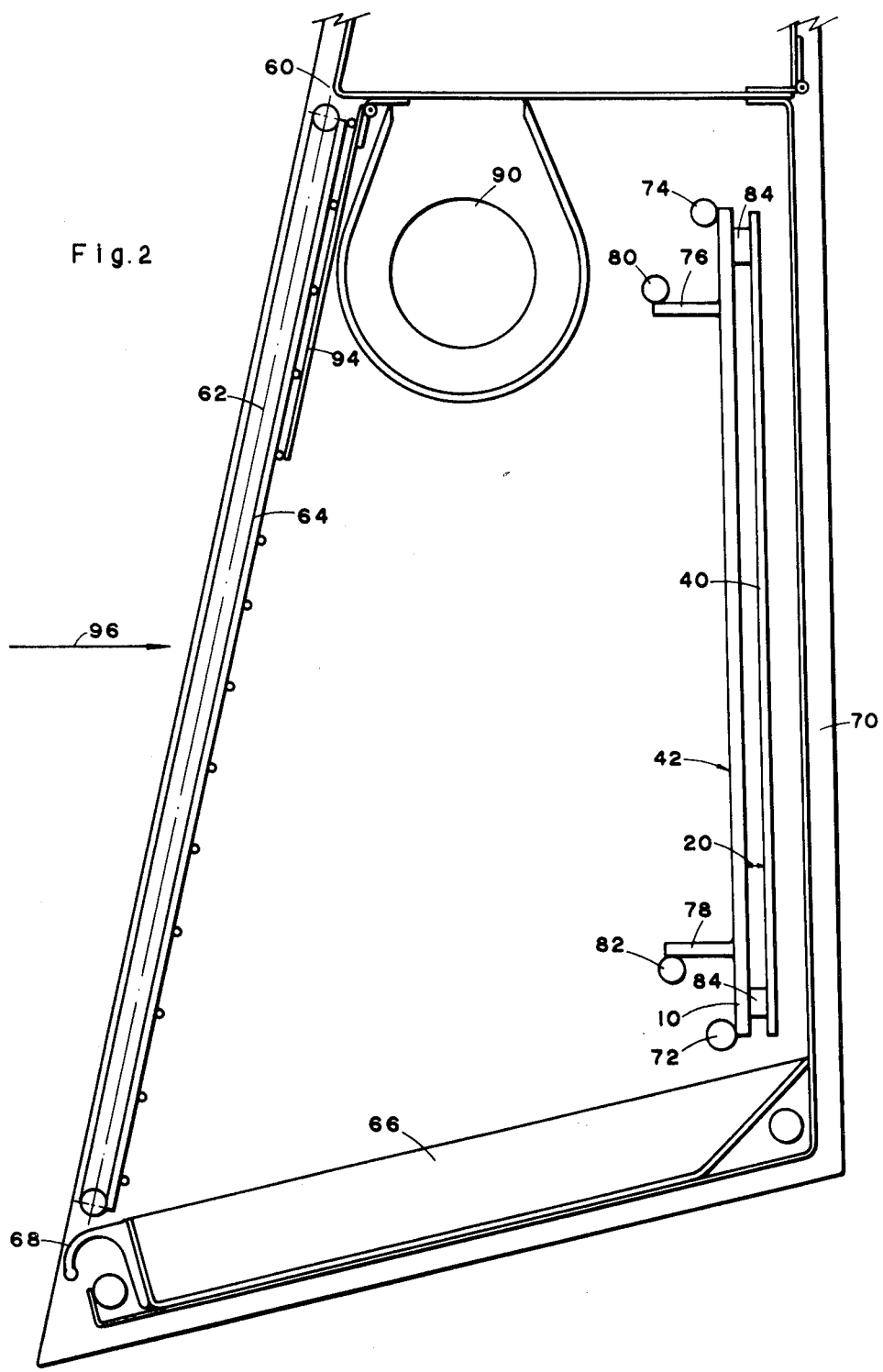
FIG. 2 is a sectional illustration of an insect electrocution device constructed and operative according to an embodiment of the invention.

Referring now to FIG. 2 there is shown in sectional view a one-sided insect electrocution device constructed and operative according to an embodiment of the invention. A generally triangular housing 60 defines an insect access opening 62 which is covered by a safety screen 64. Safety screen 64 is constructed with suitable spacing to permit insects of varying sizes to enter but at the same time to prevent spurious contact with the electrodes by foreign objects such as persons, animals, refuse or other objects which might interfere with the operation of the device and which might sustain damage upon making contact with one or more of the electrodes. An electrocuted insect collection tray 66 is provided at the bottom of housing 60 and is removably mounted therein, access thereto being provided by means of a handle 68.

The disposition and operation of the electrodes will be described by analogy to FIG. 1 using the same reference numerals as employed therein. Array 42 comprising an alternating arrangement of the electrodes 10 and 12, is disposed in a substantially planar vertical orientation adjacent back wall 70 of housing 60.

In the exemplary embodiment shown, electrodes 10, one of which can be seen in FIG. 2, are mounted on bus bar supports 72 and 74 which extend in a generally horizontal direction and support the array of electrodes 10 substantially along the entire length of the insect access opening 62.

Electrodes 12, which cannot be seen in FIG. 2, are interspersed in alternating fashion with electrodes 10 and maintained in a co-planar orientation with respect thereto. Electrodes 12 are mounted on upper and lower supports 76 and 78 onto respective horizontal bus bar supports 80 and 82, insulated from supports 72 and 74.

In accordance with a preferred embodiment of the invention electrical current is supplied to electrodes 10 via bus bar supports 72 and 74 and electrical current is supplied to electrodes 12, insulated from electrodes 10, by means of bus bar supports 80 and 82.

Electrode 40, here configured as a planar electrode, is mounted at a substantially constant spatial separation 20 from array 42 by means of insulating spacers 84 which in turn are coupled into either or both of electrodes 10 and 12 at selected intervals. Electrical current is supplied to electrode 40 by conductor means not shown herein.

The relationship between the spacing of respective electrodes 10 and 12 on one hand, and between arrays 40 and 42 on the other hand, is identical to that described hereinabove in connection with FIGS. 1 and 2.

The lamp 90, typically an elongated fluorescent lamp or another UV source, extends along substantially the entire length of insect access opening 64. A shade 94 is provided to prevent direct illumination from lamp 70 from reaching insects still outside the apparatus causing them to be attracted to the lamp rather than to electrodes 10, 12 and 40. Lamp 90 is operative to illuminate substantially all of the surfaces of electrodes 40 and 42 which face in the general direction of insect approach indicated by arrow 96. Electrodes 10, 12 and 40 are constructed to be relatively highly reflective of the radiation of lamp 90. Remaining portions of the apparatus which are illuminated by lamp 90 are preferably constructed to be substantially non-reflective. As described above in connection with FIG. 1 the larger insects tend to be initially electrocuted as they pass array 42 while the smaller insects which survive the passage to array 42 are drawn to electrode 40 by the direct illumination thereof and are electrocuted as they pass between electrode 40 and one or either of electrodes 10 and 12. The electrocuted insects fall into tray 66.

According to an alternative embodiment of the invention the apparatus illustrated in FIG. 2 may be modified such that electrodes 10 and 12 are maintained at the same potential, here termed the first potential and sheet electrode is maintained at a second potential different from the first potential. In such a case upper and lower supports 76 and 78 and bus bar supports 80 and 82 may be eliminated since all of the electrodes in array 42 may be mounted onto supports 72 and 74.

In accordance with a further alternative embodiment of the invention shade 94 may be configured to provide shading of the lamp such that insects which have already passed screen 64 do not receive direct illumination from lamp 90 until they are very close to electrode array 42.

Means are also provided for heating any or all of the electrodes to enhance their attractivity to certain types of insects such as flies.

Heating may be achieved by the passage of electrical current, by illumination or by other means not shown. It is appreciated that heating of the electrode enhances the effectiveness of bait places in the immediate vicinity of the solid electrode by enhancing the diffusion of the bait aroma.

Figures 3A, 3B:
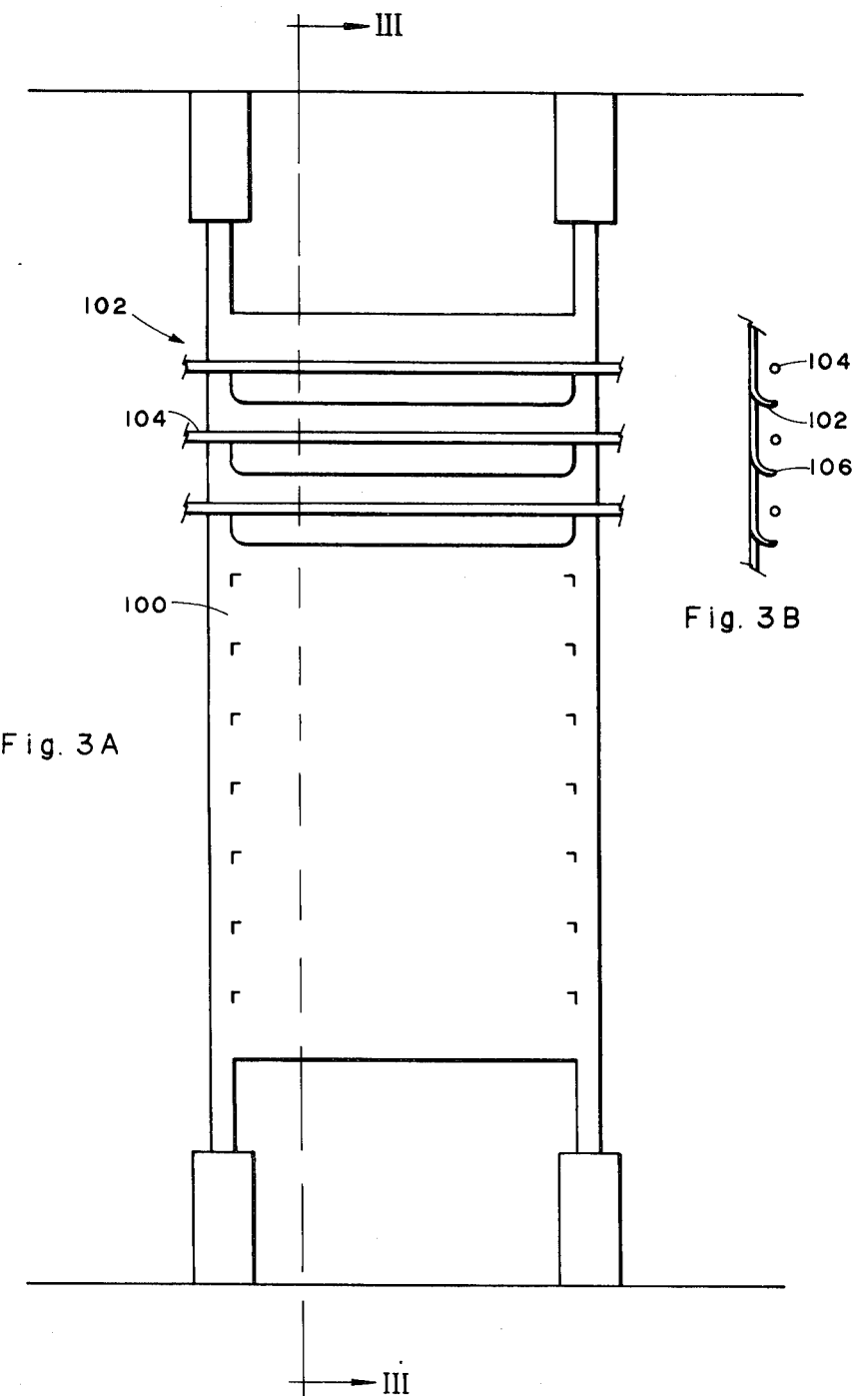
FIG. 3A is a schematic illustration of an electrode configuration of an insect electrocution device constructed and operative in accordance with an alternative embodiment of the invention.
FIG. 3B is a schematic illustration taken along the line III—III of FIG. 3A.

According to one embodiment of the invention the sheet electrode may comprise a conditioned surface such as a ribbed surface or a surface having various perforations and projections extending therefrom in a regular or irregular manner. One example of a sheet electrode constructed in accordance with such an embodiment associated with an electrode array 42 is illustrated in FIGS. 3A and 3B and comprises a sheet electrode 100 which a multiplicity of cuts and projections are formed by stamping or any other suitable technique. It should be appreciated that the sheet electrode need not necessarily be planar and may in fact comprise any suitable form of grid. The overall characteristic of the sheet electrode is that its overall surface is sheet-like.

In the illustrated embodiment a series of elongate projections 102 are formed in a predetermined spatial relationship to the electrodes 104 forming surface array 42. This configuration is particularly useful for limiting the deposition of insect remains on the surface electrode. Electrocutionn of the relatively large insects occurs between the extreme outer edge 106 of the projections 102 and the respective electrodes 104 of array 42, rather than on the main part of the surface electrode.

A possible reason for using an embossed sheet electrode surface rather than a plain surface is to achieve a more desirable distribution of the light reflected therefrom.

It will be understood by those skilled in the art that the invention is not limited by the particular embodiments shown and described hereinabove which are merely exemplary and possible embodiments and constructions thereof. For example, embodiments of the invention may be constructed in which the spacing between array 42 and electrode 40 is not uniform. The invention is therefore defined only by the claims which follow.

I claim:

1. Insect electrocution device comprising:
   a surface array composed of an arrangement of spaced first electrodes; and
   a sheet electrode disposed along a surface spaced from said surface array;

said first electrodes being maintained at a first potential;
said sheet electrode being maintained at a second potential differing from said first potential;
the electrodes forming said surface array being arranged so as to define a first substantially uniform separation therebetween; and
said sheet electrode being spaced from said surface array by a second separation smaller than said first uniform separation.

2. An insect electrocution device according to claim 1 wherein said sheet electrode is formed with a multiplicity of protrusions extending outwardly from the surface of said sheet towards said surface array.

3. An insect electrocution device according to claim 1 wherein said surface array also comprises an array of second electrodes interspersed with said first electrodes, said second electrodes being maintained at a third potential differing from said first potential.

4. An insect electrocution device according to claim 3 wherein said third potential is equal to said second potential.

5. An insect electrocution device according to claim 3 wherein said third potential differs from said second potential.

6. An insect electrocution device in accordance with claim 3 in which the potential difference between said second potential and either of said first and third potentials is less than the potential difference between said first and third potentials.

7. An insect electrocution device according to claim 3, wherein said first and second electrodes comprise elongate rods.

8. An insect electrocution device according to claim 1 and also comprising means for illuminating said sheet electrode and wherein said sheet electrode is provided with a conditioned surface whereby to define a non-uniformly lighted reflecting surface.

9. An insect electrocution device according to claim 1 and also comprising means for heating at least some of the electrodes in order to increase their attractiveness to certain types of insects and to enhance the effectiveness of bait placed in the immediate vicinity thereof.

10. An insect electrocution device according to claim 1, wherein said sheet electrode is a solid planar electrode.

11. An insect electrocution device according to claim 1, wherein said solid planar electrode is disposed generally parallel to said surface array.

12. An insect electrocution device according to claim 1, wherein said first and second electrodes are uniformly spaced from each other.

13. An insect electrocution device comprising:
a generally planar surface array composed of an alternating arrangement of first and second generally elongate, uniformly spaced electrodes; and
a generally planar sheet electrode disposed generally parallel to and spaced from said surface array and behind said surface array with respect to the expected direction of insect approach;
said first electrodes being maintained at a first potential; and said second electrodes beiing maintained at a second potential differing from said first potential;
said sheet electrode being maintained at a third potential differing from said first potential;
said first and second electrodes being arranged in said first surface array so as to define a first substantially uniform separation between respective first and second electrodes;
said sheet electrode being spaced from said first and second electrodes by a second separation smaller than said first uniform separation.

14. An insect electrocution device according to claim 13 and comprising means for heating at least one of said electrodes.

15. An insect electrocution device according to claim 14 and also comprising means for illuminating at least one of the said electrodes.

16. An insect electrocution device comprising:
a surface array composed of an arrangement of spaced first electrodes; and
a sheet electrode disposed along a surface spaced from said surface array;
said first electrodes being maintained at a first potential;
said sheet electrode being maintained at a second potential differing from said first potential; and
wherein said surface array also comprises an array of second electrodes interspersed with said first electrodes, said second electrodes being maintaned at a third potential differing from said first potential;
said first and second electrodes being arranged in said first surface array so as to define a first substantially uniform separation between respective first and second electrodes; and
said sheet electrode being spaced from said first and second electrodes by a second separation smaller than said first uniform separation.

17. An insect electrocution device according to claim 16 wherein said third potential is equal to said second potential.

18. An insect electrocution device according to claim 16 wherein said third potential differs from said second potential.

19. An insect electrocution device in accordance with claim 16 in which the potential difference between said second potential and either of said first and third potentials is less than the potential difference between said first and third potentials.

20. An insect electrocution device according to claim 16, wherein said first and second electrodes comprise elongate rods.

21. An insect electrocution device comprising:
a first array composed of an arrangement of spaced first electrodes;
a second array composed of an arrangement of spaced second electrodes interspersed with said first electrodes;
a sheet electrode disposed on a surface spaced from said first and second surface arrays;
said first electrodes being maintained at a first potential;
said second electrodes being maintained at a third potential;
said sheet electrode being maintained at a second potential differing from said first potential; and
said third potential differing from said first potential.

22. An insect electrocution device according to claim 21 wherein said sheet electrode is formed with a multiplicity of protrusions extending outwardly from the surface of said sheet towards said surface array.

23. An insect electrocution device according to claim 21 wherein said first and second potentials are both non-zero.

24. An insect electrocution device according to claim 21 wherein said first and second electrodes comprise elongate rods.

25. An insect electrocution device according to claim 21 and comprising means for illuminating said sheet electrode and wherein said sheet electrode is provided with a conditioned surface whereby to define a non-uniformly lighted reflecting surface.

* * * * *